US008065622B2

(12) United States Patent
Li et al.

(10) Patent No.: US 8,065,622 B2
(45) Date of Patent: Nov. 22, 2011

(54) DISPLAYING DEVICE WITH USER-DEFINED DISPLAY REGIONS AND METHOD THEREOF

(75) Inventors: Xiao-Guang Li, Shenzhen (CN); Kuan-Hong Hsieh, Taipei Hsien (TW); Han-Che Wang, Taipei Hsien (TW); Li Wang, Shenzhen (CN); Shin-Hong Chung, Taipei Hsien (TW); Hua-Dong Cheng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 493 days.

(21) Appl. No.: 12/202,421

(22) Filed: Sep. 1, 2008

(65) Prior Publication Data

US 2009/0064016 A1 Mar. 5, 2009

(30) Foreign Application Priority Data

Aug. 31, 2007 (CN) .......................... 2007 1 0076755

(51) Int. Cl.
*G06F 3/048* (2006.01)

(52) U.S. Cl. ......... 715/764; 715/853; 715/854; 715/810

(58) Field of Classification Search .......... 715/769–781, 715/788, 810, 853–854, 847, 764
See application file for complete search history.

(56) References Cited

U.S. PATENT DOCUMENTS 5,633,996 A * 5/1997 Hayashi et al. ............... 715/246
5,907,837 A * 5/1999 Ferrel et al. ........................... 1/1
6,166,736 A * 12/2000 Hugh ............................ 715/798
7,356,772 B2 * 4/2008 Brownholtz et al. ......... 715/752
2002/0163513 A1 * 11/2002 Tsuji ............................. 345/204
2003/0079177 A1 * 4/2003 Brintzenhofe et al. ....... 715/500
2003/0146882 A1 * 8/2003 Ogino et al. ................... 345/1.1
2003/0164851 A1 * 9/2003 Smith ........................... 345/741
2004/0078240 A1 * 4/2004 Katz ................................. 705/3
2004/0100479 A1 * 5/2004 Nakano et al. ................ 345/700
2004/0130568 A1 * 7/2004 Nagano et al. ................ 345/733
2005/0021387 A1 * 1/2005 Gottfurcht ...................... 705/10
2005/0097458 A1 * 5/2005 Wilson .......................... 715/517
2005/0108655 A1 * 5/2005 Andrea et al. ................ 715/798
(Continued)

FOREIGN PATENT DOCUMENTS

CN 100423565 10/2008
(Continued)

*Primary Examiner* — Tadeese Hailu
(74) *Attorney, Agent, or Firm* — Altis Law Group, Inc.

(57) ABSTRACT

A displaying device includes an input unit, a region defining unit, a content allocating unit, an obtaining unit, a display controlling unit and a display unit. The region defining unit defines regions by incorporating one or more unit regions in each of the regions according to users' selections and generates region defining information. The content allocating unit allocates contents for the regions according to the users' selections and generates content allocating information. The obtaining unit obtains the region defining information, the content allocating information, and contents according to the content allocating information, and then transmits the information and contents to the display controlling unit. The display controlling unit splits a display area of the display unit into the regions defined by the region defining unit and displays the contents in the regions correspondingly according to the content allocating information. Related methods are also provided.

8 Claims, 7 Drawing Sheets

U.S. PATENT DOCUMENTS

| | | | | |
|---|---|---|---|---|
| 2006/0110171 | A1* | 5/2006 | Miyazawa et al. | 399/8 |
| 2006/0139373 | A1* | 6/2006 | Sloo et al. | 345/629 |
| 2007/0101262 | A1* | 5/2007 | Suzuki et al. | 715/525 |
| 2007/0103408 | A1* | 5/2007 | Tada et al. | 345/76 |
| 2007/0168859 | A1* | 7/2007 | Fortes | 715/700 |
| 2007/0279315 | A1* | 12/2007 | Laves et al. | 345/1.1 |
| 2009/0003731 | A1* | 1/2009 | Nitta et al. | 382/298 |
| 2009/0293008 | A1* | 11/2009 | Fujii et al. | 715/769 |

FOREIGN PATENT DOCUMENTS

| | | |
|---|---|---|
| CN | 100525398 | 8/2009 |

* cited by examiner

| Region | Location | Content |
|---|---|---|
| A | aa,ab,ac,<br>ba,bb,bc | Image |
| B | ca | Textual memo |
| C | cb,cc | Calendar/time<br>information |

Fig. 6

DISPLAYING DEVICE WITH USER-DEFINED DISPLAY REGIONS AND METHOD THEREOF

BACKGROUND

1. Technical Field

The present invention relates to displaying devices and methods thereof, and particularly to a displaying device with user-defined display regions and method for displaying contents in the user-defined display regions.

2. General Background

Many electronic devices, such as mobile phones, digital photo frames, and so on, generally have unchangeable layouts of components on their display interfaces. For instance, the images, textual memos of the images, and real calendar/time information that are displayed on digital photo frames are fixed at their respective positions on the display interface. Users cannot change the positions and display areas of the components to meet their personalized requirements.

What is needed, therefore, is a displaying device and method which can solve the problem mentioned above.

SUMMARY

A displaying device with user-defined regions is provided. The displaying device includes an input unit, a display unit, and a central controller. The display unit includes a display area constituted by a plurality of unit regions arranged along one or two dimensions of the display area. The central controller includes a region defining unit and a content allocating unit. The region defining unit is configured for defining regions on the display area by incorporating one or more unit regions in each region in accordance with confirm signals from the input unit, and accordingly generating region defining information. The content allocating unit is configured for allocating contents for the regions in accordance with the confirm signals from the input unit, and accordingly generating content allocating information. The central controller further includes an obtaining unit and a display controlling unit. The obtaining unit is configured for obtaining the region defining information and the content allocating information, parsing this information, and obtaining contents according to the content allocating information. The display controlling unit is configured for receiving the parsed region defining information, the parsed content allocating information, and the contents from the obtaining unit, splitting the display area into regions according to the parsed region defining information and displaying the contents in the regions correspondingly according to the parsed content allocating information.

A method for defining regions on a display area of a display unit based on confirm signals from an input unit and displaying contents on the regions is also provided. The method includes the steps of: displaying unit regions constituting the display area; receiving the confirm signals from the input unit; defining two or more regions by incorporating one or more of the unit regions in each of the regions according to the confirm signals, generating and storing the region defining information in a storage; allocating contents for the regions according to the confirm signals, generating and storing the content allocating information in the storage; obtaining the region defining information and the content allocating information from a storage; parsing the region defining information and the content allocating information; splitting the display area into the regions defined by the region defining information; and obtaining contents and displaying the contents on the regions correspondingly according to the content allocating information.

Other advantages and novel features will be drawn from the following detailed description with reference to the attached drawings.

BRIEF DESCRIPTION OF THE DRAWINGS

The components of the drawings are not necessarily drawn to measuring scale, the emphasis instead being placed upon clearly illustrating the principles of the displaying device with user-defined display regions and method thereof. Moreover, in the drawings, like reference numerals designate corresponding parts throughout the several views.

FIG. 6 shows a table stored in a storage of the displaying device of FIG. 1, the table contains region defining information generated in the region defining procedure of FIG. 3 and content allocating information generated in the content allocating procedure of FIG. 5.

DETAILED DESCRIPTION OF THE EMBODIMENTS

Figure 1:
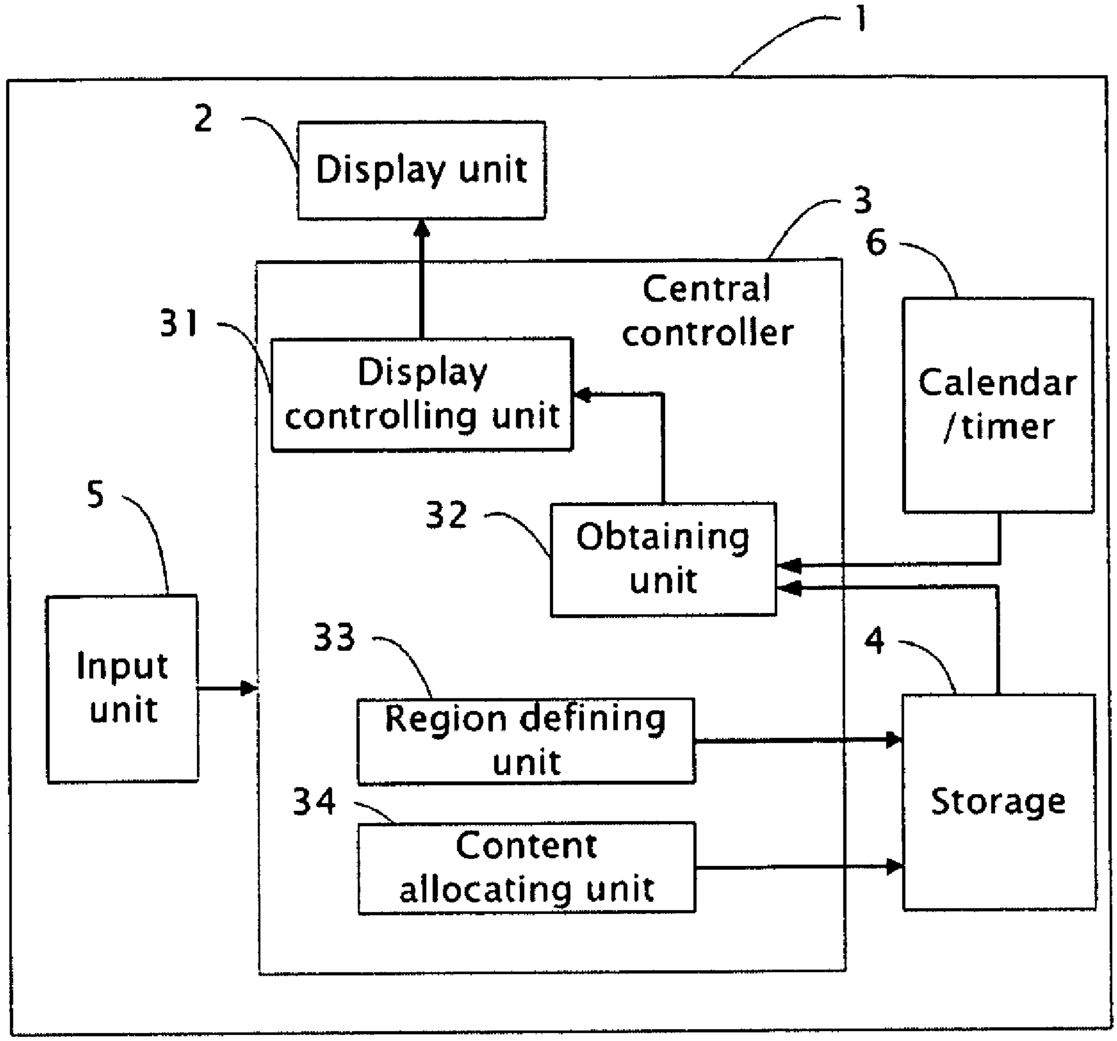
FIG. 1 is a block diagram showing hardware structure of an exemplary embodiment of a displaying device with user-defined regions.

Referring to FIG. 1, the functional structure of a displaying device 1 in accordance with an exemplary embodiment of the present invention is shown. A digital photo frame is taken as an example for the displaying device 1 in the embodiment. The displaying device 1 includes a display unit 2, a central controller 3, a storage 4 and an input unit 5. The storage 4 stores various information, such as image data files and additional information files. The additional information files may include textual memo information corresponding to the image data files. The central controller 3 reads the image data files and the additional information files from the storage 4, and then controls the images and additional information recorded in those files displayed by the display unit 2 according to input signals from the input unit 5.

The central controller 3 includes a display controlling unit 31, an obtaining unit 32, a region defining unit 33, and a content allocating unit 34. The region defining unit 33 is configured for receiving the input signals from the input unit 5, defining regions in the display area of the display unit 2 according to the input signals and generating region defining information. The region defining information is then stored in the storage 4. The content allocating unit 34 is configured for receiving the input signals from the input unit 5, allocating contents (e.g., the images, the additional information and so on) for the regions according to the input signals and generating content allocating information. The content allocating information is also stored in the storage 4. The obtaining module 32 is configured for obtaining the image data files, the additional information files as well as the region defining information and the content allocating information from the storage 4, thereby transmitting the files and the information to the display controlling unit 31. Typically, after receiving the files and the information, the display controlling unit 31 first splits the display area of the display unit 2 into two or more regions defined by the region defining information and then displays the images and the additional information in the regions correspondingly according to the content allocating information. The obtaining unit 32 may further be configured for obtaining additional information from other information sources. For example, the obtaining unit 32 may be configured for obtaining real calendar/time information from a calendar/timer 6. The real calendar/time information is displayed on a corresponding region of the display unit 2 under the control of the display controlling unit 31 based on the content allocating information.

Figure 2:
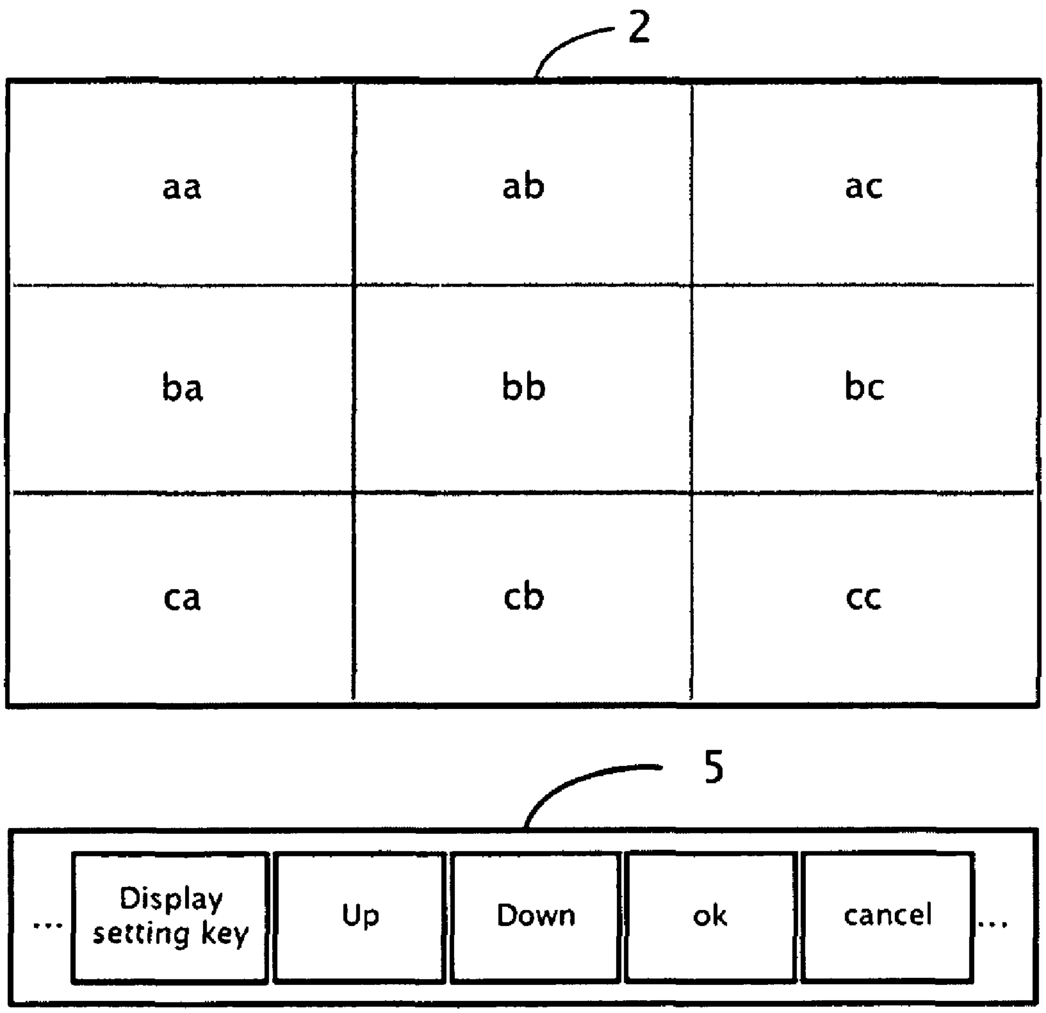
FIG. 2 is a schematic view showing a display area of a display unit of the displaying device of FIG. 1.

Referring also to FIG. 2, the display area of the display unit 2 is constituted by a plurality of equal unit regions that are arranged in order along one or two dimensions of the display area. The unit regions are visible and distinguishable after a display setting key of the input unit 5 is pressed and transmits a display setting signal to the central controller 3. The visible unit regions allow users to define the regions of the display area by using the Up/Down keys, an Ok key and a Cancel key of the input unit 5. FIG. 2 shows an exemplary example that the display area is constituted by nine equal unit regions aa, ab, ac, ba, bb, bc, ca, cb, and cc.

Figure 3:
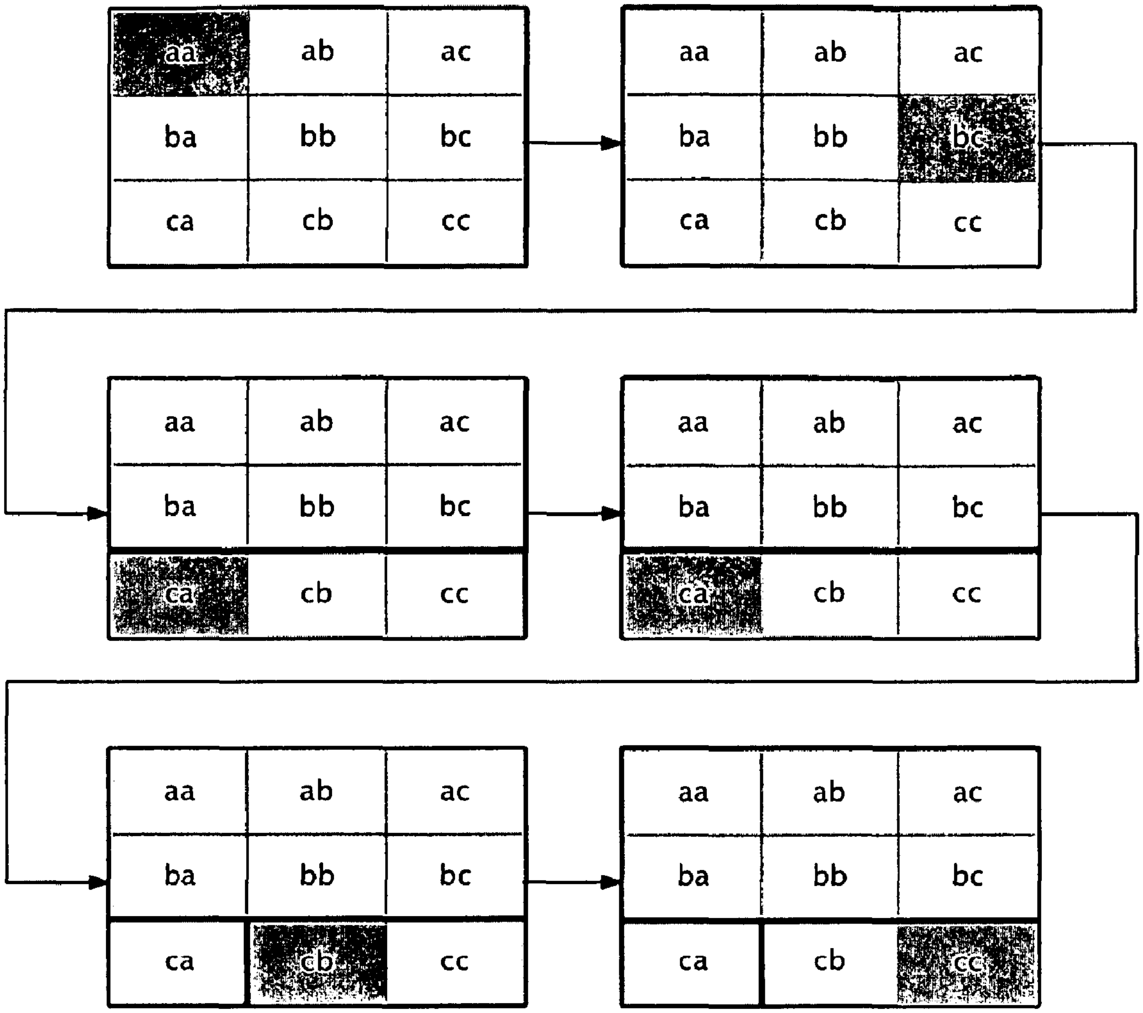
FIG. 3 is a flowchart showing an exemplary embodiment of a region defining procedure reflected on the display area of FIG. 2.

FIG. 3 gives an exemplary embodiment of a region defining procedure reflected on the display area of FIG. 2. First, a cursor on the display area is rested on the aa unit region, which is confirmed when a confirm signal from the Ok key is received by the region defining unit 33. The cursor is moved to the bc unit region, which is confirmed when a confirm signal from the Ok key is received by the region defining unit 33, whereupon a first region is determined by the aa and bc unit regions and includes the contiguous unit regions aa, ab, ac, ba, bb and bc. The cursor is further moved to the ca unit region, which confines a second region when the ca unit region is double confirmed by receiving two confirm signals from the Ok key at the region defining unit 33. In this exemplary embodiment, the cursor is further moved to define a third region determined by the contiguous unit regions cb and cc, the same process by which the first region is determined is executed and therefore a description is omitted. In other available embodiments, the remaining unit regions cb and cc are automatically determined by the region defining unit 33 as the third region, requiring no manual confirms from the users as FIG. 3 shows. The region defining unit 33 simultaneously generates the region defining information as part of the region defining procedure and finally stores the region defining information in the storage 4.

Figure 4:
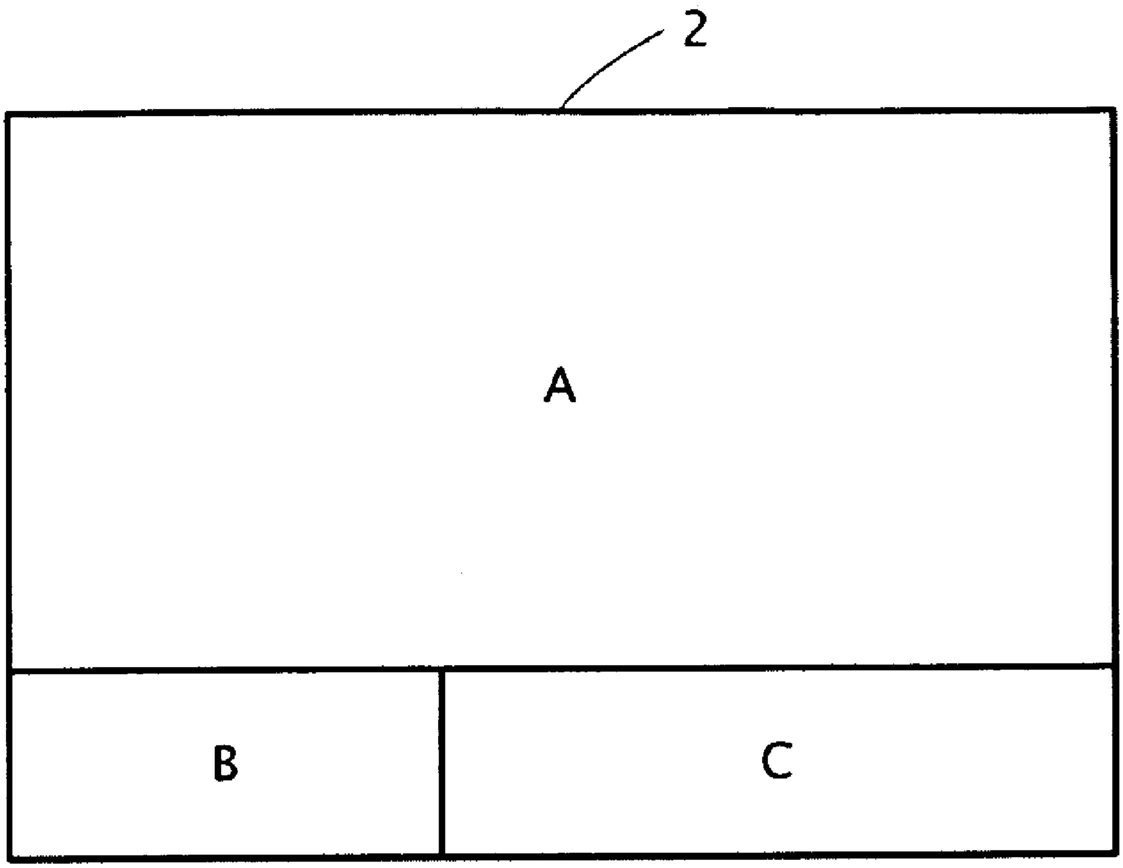
FIG. 4 is schematic view showing a region defining result of FIG. 3.

FIG. 4 shows a region definition result of FIG. 3. The display area has been split into three regions, the first of which is labeled as A, the second labeled as B and the third labeled as C. A, B and C are recorded as names of the regions by the region defining unit 33 in the region defining information.

Figure 5:
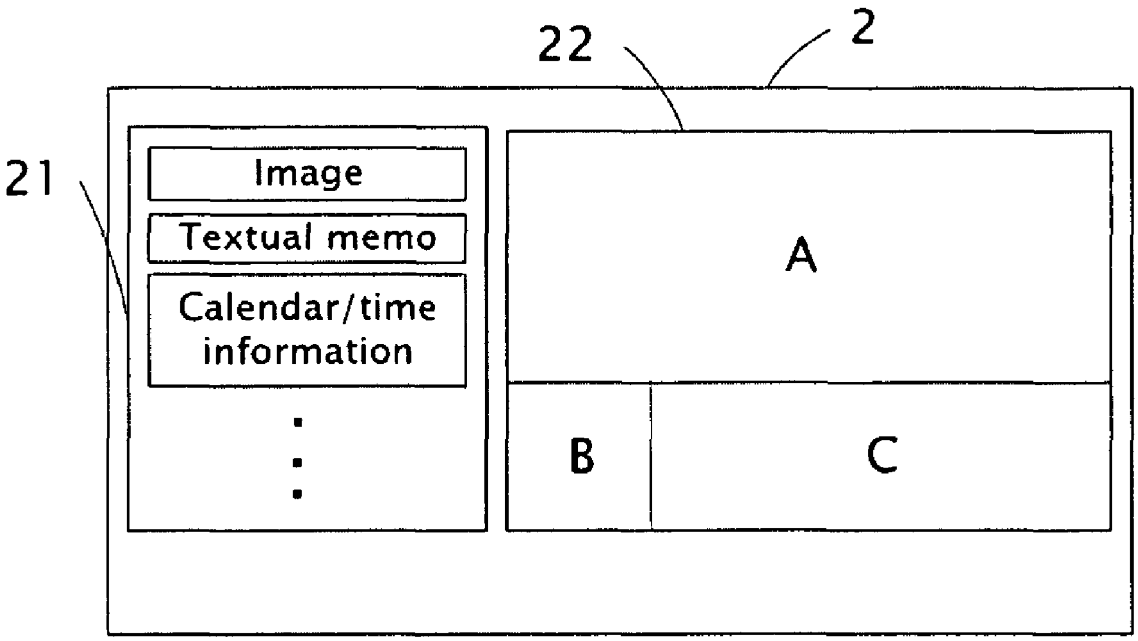
FIG. 5 is a schematic view showing an exemplary embodiment of a content allocating procedure for regions of FIG. 4

FIG. 5 shows an exemplary embodiment of a content allocating procedure for the regions A, B and C. The content allocating procedure begins after the region defining procedure is completed. A content list 21 which lists a plurality of content icons is displayed at the left portion of the display area and a sample 22 of the display area with the regions A, B and C is displayed at the right portion of the display area. Basically, the content icons each represent a resident software program executable by the displaying device 1. By way of example, the content icon labeled “Image” represents an image displaying program which is executed by the central controller 3 to display the images on the display unit 2, the content icon labeled “Textual memo” represents a textual memo displaying program which is executed by the central controller 3 to display the textual memos of the images on the display unit 2, and the content icon labeled “Calendar/time information” represents a real calendar/time displaying program which is executed by the central controller 3 to display the real calendar/time information on the display unit 2.

The content icons are selectable by operating the Up/Down keys, the Ok key and the Cancel key. After a particular content icon is selected, the regions A, B and C become configurable to allow the user to select a region to display content relating to the particular content icon. The content icons and the regions are configurable, alternately, to allow the user to firstly select a content icon and secondly select a region correspondingly during the content allocating procedure. The content allocating procedure is either terminated when all of the regions A, B and C have been allocated with content or when the user manually terminates the procedure, for example, by pressing the Cancel key. The content allocating unit 34 simultaneously generates the content allocating information as a part of the content allocating procedure and finally stores the content allocating information in the storage 4.

FIG. 6 shows the region defining information and the content allocating information stored in the storage 4 based on the exemplary embodiment given in FIGS. 2 through 5. The region defining information associates region A to the unit regions aa, ab, ac, ba, bb and bc, region B to the unit regions ca, and region C to the unit regions cb and cc. The content allocating information designates region A for displaying images, region B for displaying textual memos of the images, and region C for displaying the real calendar/time.

Figure 7:
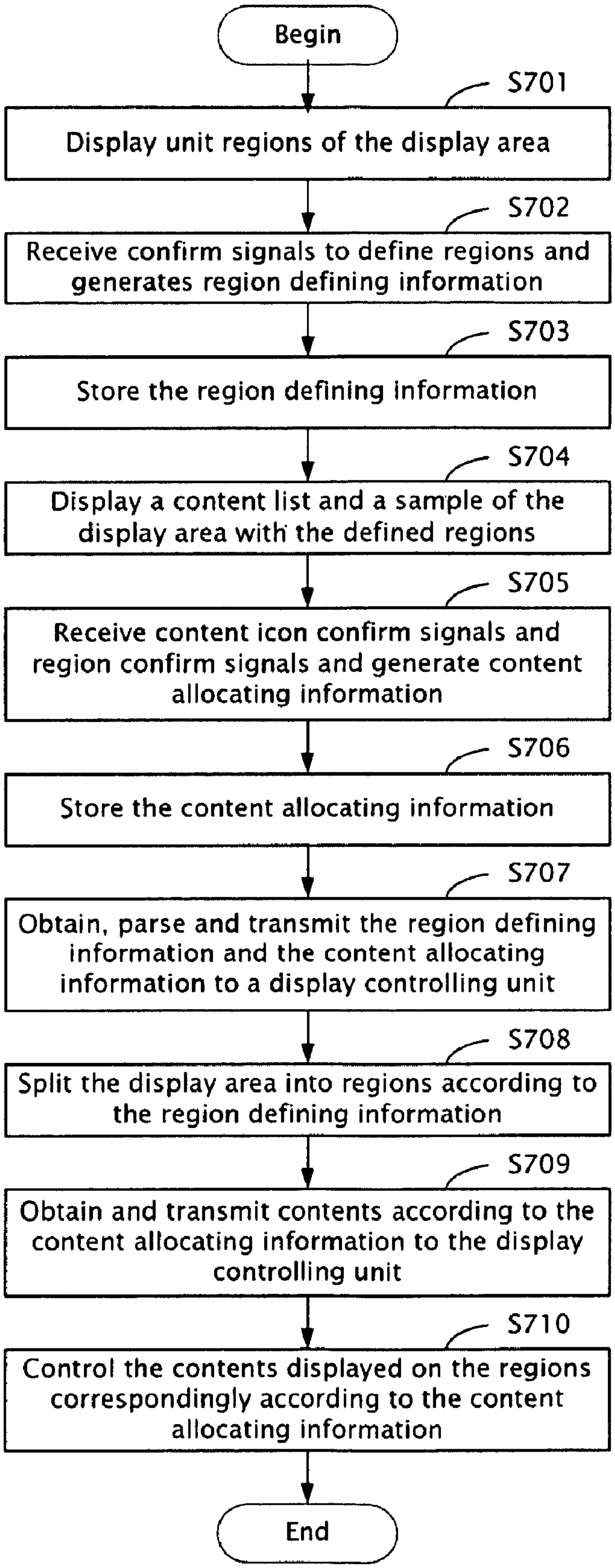
FIG. 7 is a flowchart of a method for defining regions and displaying contents in the regions.

FIG. 7 shows a flowchart of a method for defining a plurality of regions on the display unit 2 and displaying images and additional information in the regions. The method begins with step S701 where the region defining unit 33 displays the unit regions of the display area of the display unit 2. In step S702, the region defining unit 33 receives confirm signals from the input unit 5 to confirm one or more of the unit regions to be included in a region and simultaneously generates the region defining information. Step S702 repeats when two or more regions are defined. The procedure proceeds to step S703 when a required number of regions are defined. In step S703, the region defining unit 33 stores the region defining information in the storage 4.

In step S704, the content allocating unit 34 simultaneously displays the content list 21 and the sample 22 of the display area with the defined regions on the display area. The content list 21 lists a plurality of content icons, each of which represents a resident software program. The resident software program is typically used to display content such as images, textual memo of the images, and real calendar/time information on the display area. In step S705, the content allocating unit 34 receives a content icon confirm signal and a region confirm signal representing a selected content icon and a selected region correspondingly and generates the content allocating information. Step S705 repeats until all of the regions have been allocated with content or when the user manually terminates the content allocating procedure. In step S706, the content allocating unit 34 stores the content allocating information in the storage 4.

In step S707, the obtaining unit 32 obtains the region defining information and the content allocating information from the storage 4, parses the region defining information and the content allocating information, and transmits the parsed region defining information and the parsed content allocating information to the display controlling unit 31. In step S708, the displaying controlling unit 31 splits the display area of the display unit 2 into two or more regions according to the parsed region defining information. In step S709, the obtaining unit 32 obtains contents according to the parsed content allocating information from the storage 4 and/or other information sources, such as the calendar/timer 6, and transmits the contents to the display controlling unit 31. In step S710, the display controlling unit 31 controls the contents displayed on the regions correspondingly according to the parsed content allocating information. Generally, the display controlling unit 31 includes a plurality of software programs configured for displaying particular content types on the corresponding regions. For example, the display controlling 31 includes the image displaying program, the textual memo displaying program, and the real calendar/time information displaying program for respectively displaying the images, the textual memos, and the real calendar/time information correspondingly on particular regions.

Although the present invention has been specifically described on the basis of exemplary embodiments thereof, the invention is not to be construed as being limited thereto. Various changes or modifications may be made to the embodiment without departing from the scope and spirit of the invention.

What is claimed is:

1. A displaying device with user-defined regions, comprising:

an input unit;

a display unit comprising a display area constituted by a plurality of unit regions arranged along one or two dimensions of the display area; and a central controller, comprising:

a region defining unit configured for defining regions on the display area by using Up/Down keys, an Ok key and a Cancel key of the input unit to operate the unit regions and incorporating one or more unit regions in each of the regions in accordance with confirm signals from the input unit, and for generating region defining information;

a content allocating unit configured for allocating contents for the defined regions in accordance with the confirm signals from the input unit, and for generating content allocating information, wherein the contents comprise images and additional information corresponding to the images;

an obtaining unit configured for obtaining the region defining information and the content allocating information, parsing the region defining information and the content allocating information, and obtaining contents according to the parsed content allocating information; and a display controlling unit configured for receiving the parsed region defining information, the parsed content allocating information, and the contents from the obtaining unit, splitting the display area into the regions according to the parsed region defining information and displaying the images in a part of the regions and the additional information corresponding to the images in other part of the regions correspondingly according to the parsed content allocating information.

2. The displaying device as claimed in claim 1, wherein the region defining unit defines the unit regions, which a cursor on the display area moves through during two successive confirm signals from the Ok key are received by the region defining unit, as one region.

3. The displaying device as claimed in claim 2, wherein when a unit region is double confirmed by receiving two successive confirm signals from the Ok key at the region defining unit, a region is defined from the unit region.

4. The displaying device as claimed in claim 1, wherein when the content allocating unit allocates the contents for the defined regions, a portion of the display area displays content icons and the other portion displays the regions, and when both a content icon and a region are respectively selectable by operating the Up/Down keys, the Ok key and the Cancel key, the content allocating unit allocates a content for the content icon to the region.

5. A method for displaying contents based on user defined information, comprising the steps of:

obtaining region defining information and content allocating information from a storage, wherein the region defining information defines regions by using Up/Down keys, an Ok key and a Cancel key to operate the unit regions and incorporating one or more unit regions in each of the regions based on confirm signals from users, and the content allocating information records a relationship between each region and content allocating for the region based on confirm signals from the users;

parsing the region defining information and the content allocating information;

splitting a display area of a display unit into the regions defined by the region defining information; and obtaining contents, wherein the contents comprise images and additional information corresponding to the images, and displaying the images in a part of the regions and the additional information corresponding to the images in other part of the regions of the display area correspondingly according to the content allocating information.

6. The method as claimed in claim 5, wherein the unit regions are defined, which a cursor on the display area moves through during two successive confirm signals from the Ok key are received, as one region.

7. The method as claimed in claim 6, wherein when a unit region is double confirmed by receiving two successive confirm signals from the Ok key, a region is defined from the unit region.

8. The method as claimed in claim 5, wherein when the contents are allocated for the defined regions, a portion of the display area displays content icons and the other portion displays the regions, and when both a content icon and a region are respectively selectable by operating the Up/Down keys, the Ok key and the Cancel key, a content for the content icon is allocated to the region.

* * * * *